United States Patent
Korn et al.

(10) Patent No.: US 12,360,962 B1
(45) Date of Patent: Jul. 15, 2025

(54) SEMANTIC DATA DETERMINATION USING A LARGE LANGUAGE MODEL

(71) Applicant: CrowdStrike, Inc., Sunnyvale, CA (US)

(72) Inventors: Arnd Korn, Berlin (DE); Erdem Toraman, Leipzig (DE); Nikola Milicic, Berlin (DE); Ritesh Puj, Berlin (DE)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/586,318

(22) Filed: Feb. 23, 2024

(51) Int. Cl.
*G06F 16/00* (2019.01)
*G06F 16/21* (2019.01)
*G06F 21/64* (2013.01)

(52) U.S. Cl.
CPC ............ *G06F 16/212* (2019.01); *G06F 21/64* (2013.01)

(58) Field of Classification Search
CPC ........ G06F 40/20; G06F 40/30; G06F 40/284; G06F 16/3344; G06F 16/9024; G06F 16/34; G06F 16/258; G06F 16/254; G06F 40/18; G06F 16/3329; G06F 18/217; G06F 8/34; G06F 18/22; G06F 18/2113; G06F 40/174; G06F 16/2282; G06F 16/335; G06F 17/18; G06F 11/34; G06F 16/215; G06F 16/243; G06F 40/40; G06F 16/252; G06N 3/0475; G06N 3/0455; G06N 20/00; G06N 3/045; H03M 7/6011; H03M 7/3084; H03M 7/3082
See application file for complete search history.

(56) References Cited

U.S. PATENT DOCUMENTS

| | | | | |
|---|---|---|---|---|
| 2021/0365344 A1* | 11/2021 | Bui | ................ | G06F 17/18 |
| 2023/0094730 A1* | 3/2023 | Zhang | ................ | G06F 40/186 |
| | | | | 704/9 |
| 2023/0147366 A1 | 5/2023 | Marcjan et al. | | |
| 2024/0168968 A1* | 5/2024 | Honna | ................ | G06F 16/258 |
| 2024/0220581 A1* | 7/2024 | Dines | ................ | G06F 18/217 |
| 2024/0427810 A1* | 12/2024 | Tishbi | ................ | G06F 40/284 |
| 2025/0005299 A1* | 1/2025 | Padmanabhan | ....... | G06F 16/335 |

FOREIGN PATENT DOCUMENTS

| | | |
|---|---|---|
| CN | 112507658 | 3/2021 |
| CN | 116304738 | 6/2023 |
| CN | 116860221 | 10/2023 |

\* cited by examiner

*Primary Examiner* — Yicun Wu
(74) *Attorney, Agent, or Firm* — Lee & Hayes, P.C.

(57) ABSTRACT

Techniques for automatically determining metadata for fields of a data string, byte slice, or byte array using a semantic data model framework (SDMF) and a large language model (LLM) are discussed herein. The LLM can provide field descriptions to the SDMF which outputs additional or finer field descriptions. The techniques can include determining descriptions for fields of a non-standardized data string from a third-party or other entity thereby enabling analysis of third-party data strings for a potential security threat. The techniques can reduce an amount of time to identify missing metadata caused by lack of standardization of field names and evolving data feeds (e.g., third-parties).

20 Claims, 5 Drawing Sheets

SEMANTIC DATA DETERMINATION USING A LARGE LANGUAGE MODEL

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

A computer may recognize malware in a data transaction by classifying portions of the data transaction as originating from a threat actor (e.g., Yes) or not (e.g., No). Before the portions of the data transaction can be classified as originating from the threat actor, a user provides input to the computer to define the portions of the data transaction so that a subsequent data transaction having similar portions can be "recognized" by the computer. In some examples, data transactions among different devices can be delayed until the user defines each portion of data for each of the different devices to prevent a device from implementing malware or other security threat.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This application describes techniques for automatically determining semantic information for fields of a data string, byte slice, or byte array using a semantic data model (SDM) and a large language model (LLM). The large language model can provide field descriptions to the semantic data model which outputs different, additional, and/or finer field descriptions. The techniques can include determining descriptions for fields of a non-standardized data string from a third-party (or other entity) thereby enabling analysis of third-party data strings for a potential threat. In some examples, the field descriptions can be stored in a catalog available to computing devices (and developers) for defining or implementing different security threat concepts. The techniques can reduce an amount of time to determine missing metadata caused by lack of standardization of field names and/or by evolving data sources (e.g., third-parties).

In various examples, a system comprising a semantic data model and a large language model (or other component or model) can determine a description for input data including a field of a data string, and provide the description to other computing devices to enable the computing devices to "understand" the data in the field. For example, the system can aggregate data representing a data string, byte slice, or byte array and analyze the aggregated data to identify non-standardized data (e.g., data not following a format provided by a Standards Organization, etc.) and/or a data field without a description or metadata. The system can also define or otherwise provide a description for one or more fields of the input data. By using the descriptions provided by the system as described herein, a same or different system can determine presence of potential security threats (e.g., an unauthorized process, thread, executable, or other activity) in the input data and/or in subsequent data received at a later time based on a description of the fields.

The system can, for example, receive input data having different formats and/or from different data sources, and determine semantic data for one or more data fields of the input data. In some examples, the system can receive a data string from a host device representing data transactions by the host device over time. The host device may exchange data with another host device (e.g., of a same organization) and/or a third-party device (e.g., a device outside operational control by the organization). Thus, the data string may include fields that the organization defines or wants to define (e.g., for exchange between host devices using a pre-determined format) as well as fields that the third-party device uses when exchanging data with the host device.

In various examples, the data string can include data from the third-party device having a non-standard format, a field without an identifier (e.g., to determine a type of field), a field without metadata to describe what the field represents, and so on. The non-standard format can include a field out of position relative to another field thereby causing the data string to have fields out of a sequence associated with a standard. By using the techniques described herein, the system can automatically and proactively identify semantic information for various fields to enable subsequent processing of corresponding fields in a subsequent data string independent of user input. In some examples, the system can provide descriptions for fields to a host device to improve analysis of data strings by the host device (e.g., to detect malicious activity by recognizing more fields) whether or not the host device requested such descriptions. The system can send updated descriptions for newly described fields to various devices over time so that the devices are capable of monitoring and analyzing such fields.

In some examples, the system can provide descriptions for fields responsive to receiving a security concept from a host device. For example, the host device can provide data to the system that identifies a set of fields (e.g., system id, user name, email, etc.) and further identifies an example(s) for each field (e.g., an example system id, user name, etc.). The data from the host device can include key value pairs indicating the field name and associated example (e.g., system id:cc0d8e3c, user name: jdoex123, etc.). Generally, the security concept can represent fields that a client (or host device) of a security service would like to evaluate, and possible examples of the types of data for detecting at a later time. In various examples, another computing device may use a different naming system, schema, or format, and the system can determine descriptions for fields regardless of naming system, schema, or format used by the computing device.

By way of example and not limitation, developers of various organizations can implement varying security strategies including providing lists of fields to relate as a security concept to a security provider. The security concept can be used as a framework to identify which fields of input data (e.g., a data string) to monitor or otherwise detect such as when determining the presence or activity of a threat actor. In various examples, the system can generate descriptions for fields at different levels of granularity so that each field and/or related field(s), can be identified in a subsequent data string. For instance, the output data from the system can be transmitted to other devices proactively (without the devices sending a request for a security concept) to enable the other devices to interpret fields in data strings associated with a variety of devices (both inside and outside of an organization). In some examples, the output data can represent different levels of detail for a field including proactively identifying related fields or missing field descriptions.

In various examples, the output data can, in some examples, be stored in a storage device as a "catalog" available to various devices. The stored description data can be updated, deleted, added, or otherwise managed over time to maintain a list of descriptions that can be provided to the various devices periodically and/or upon request. In examples when an organization initiates a request for a security concept, the system can identify a related, existing security concept from the stored data, and send some or all of the stored data to the organization and/or to other organizations (e.g., and associated with host devices). In this way, descriptions for fields can be provided to other devices in less time versus waiting for the system to perform the analysis for each security concept responsive to individual requests and can do so without requiring further input from an organization (e.g., from a developer or component of the host device to manually validate a description, write code, etc.).

In various examples, the large language model can receive input data representing a security concept (e.g., field examples) and output data representing field descriptions. The large language model can, for instance, send the output data to the semantic data model for further processing. In various examples, the large language model can receive a set of field identifiers and examples for each field identifier as input and determine a field type and a description for each field and/or for the set of fields collectively. For instance, the large language model can generate a description for each field associated with the set of field identifiers and/or a description for the set of fields (e.g., each of the fields relates to a user). Additional description for determining semantic data can be found throughout this disclosure including in the figures below.

In some examples, data output by the system can be transmitted to a host device to enable the host device to improve detection of data fields and the information included therein. Outputting the descriptions by the system enables improved detection, remediation, and analysis of data exchanged with various data sources (versus not implementing the system). In various examples, the system can be implemented as a cloud-based service configured to determine descriptions, security concepts, and the like, that improve subsequent detection of malicious events (e.g., by improving how fields are identified, determining related fields, etc.). The system can determine descriptions for fields that are more accurate than existing descriptions and/or provide descriptions for fields having no current description. By determining semantic data for the data fields, the system can determine information usable for developing a defense strategy against future malicious events.

In some examples, the system can implement a user interface to exchange data with the host devices receiving description data. The user interface can, for example, enable a user of the host device to send a message regarding protecting the host device and data streams associated therewith from future malicious events (e.g., to send a security concept). The user interface can also or instead be configured to receive data from the system for output on a display device (e.g., to validate a description from the system). In various examples, the host device can receive description data as a service and independent of sending a request for such data.

In various examples, the system can receive, as input data, a portion of the data stream from a storage device (or receive the portion in real-time independent of the database), such as a data stream database that receives (and in some instances replicates) all data associated with the data stream. By using the techniques described herein, data usable for protecting the host device and/or the data stream can be identified in less time and with more accuracy (e.g., versus relying on a human to analyze and convey the analyzed data to a user of the host device).

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques described herein can improve the quality of data transmitted using a security provider by reducing an amount of data transmitted over a network in association with modeling security concepts in a sharable catalog. For instance, the techniques can improve network efficiency (e.g., save network bandwidth, free up memory and/or processor resources, etc.) by proactively providing a catalog of field descriptions and security concepts to devices free of receiving a request from a device and/or requiring the device to manually determine security concepts. Devices can receive a catalog proactively to enable each respective device to interpret data fields of input data (e.g., a data string, etc.) thereby saving network and computational resources that would otherwise be used to manage data fields (e.g., repeating steps already followed when setting up a security concept).

The techniques described herein can improve functioning of a computing device by providing a scalable and efficient method for predicting descriptions for fields of a data string. For example, the computing device can determine security concepts over time resulting in a catalog covering security concept requests from a device (based on a similar concept being processed previously) thereby saving computational resources (e.g., a memory, a processor, and the like) that would otherwise be used to process similar security concepts for different host devices (e.g., customers, organizations, etc.). The system can transmit the catalog to the devices to reduce an amount of time and resources used to generate accurate field descriptions (versus involving a user or individual requests from devices when not implementing the system).

Although in some examples the system comprises a computing device and a host device, in other examples, the system may enable the techniques described herein to be performed by the host device independent of the computing device and/or independent of a network connection. That is, either the host device and/or the computing device may implement one or more components and/or models to generate data field descriptions usable to prevent a possible malicious event over time.

In various instances, a computing device may install, and subsequently execute a security agent as part of a security service system to monitor and record events and/or patterns on a plurality of computing devices in an effort to detect, prevent, and mitigate damage from malware or malicious activity. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent can, for instance, reside on the host device, observe and analyze events that occur on the host device, and interacts with a security system to enable a detection loop that is aimed at defeating all aspects of a possible attack.

Some examples herein relate to defining portions of data to detect malware or malicious behavior by, for example, implementing a large language model to provide suggested descriptions to a semantic data model. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the terms "threat actors" and "adversaries" include, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing a data string, byte slice, byte array, event stream, data sequence, or the like, indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events based on the field descriptions, permitting malware detection without requiring disassembly or other inspection of the code for that malware. Of course, the techniques can also be used to detect single, non-repetitive, instances that may occur in input data.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

Figure 1:
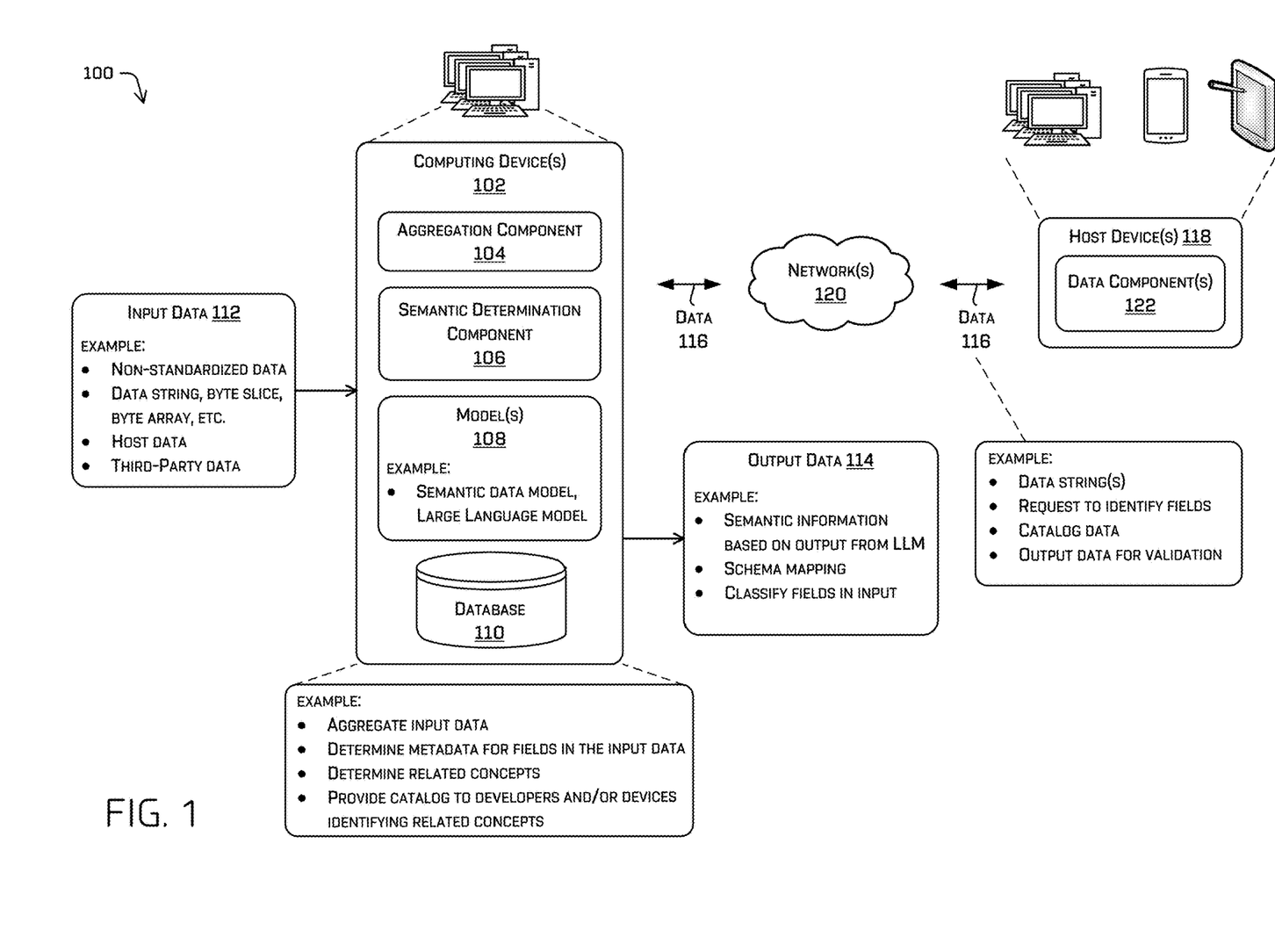
FIG. 1 illustrates an example block diagram of an example computer architecture for determining semantic information describing fields in example input data, as described herein.

FIG. 1 illustrates an example block diagram 100 of an example computer architecture for determining semantic information describing fields in example input data, as described herein. The diagram 100 includes one or more computing device(s) 102 associated with a service system such as a security provider. In various examples, the service system may be part of, or associated with, a cloud-based service network that is configured to implement aspects of the functionality described herein.

FIG. 1 depicts the computing device(s) 102 comprising an aggregation component 104, a semantic determination component 106, one or more models 108, and a database 110 to perform the functionality described herein. For instance, the computing device(s) 102 can implement one or more components and/or one or more models to receive input data 112 such as a data string, byte array, byte slice, etc. and determine output data 114 indicating semantic information describing some or all of the input data 112 (e.g., a field of a data string).

In various examples, the computing device(s) 102 can exchange data 116 with one or more host device(s) 118 over one or more network(s) 120. The data 116 can represent one or more data strings (or other data structure) associated with the host device(s) 118 though the data 116 can come from a variety of data sources (e.g., data provided by the host device can include third-party data which may not follow a same data format, field naming schema, etc. as the host device). In some examples, the data 116 can represent a request to determine a security concept and/or a request to identify fields of input data. For instance, the host device(s) 118 can transmit a message requesting a field description as part of the data 116 to the computing device(s) 102 to cause the generation of the output data 114. However, in other examples, the computing device(s) 102 can perform the techniques described herein independent of exchanging the data 116 with the host device(s) 118.

In various examples, the aggregation component 104 may aggregate, identify, retrieve, access, or otherwise determine input data 112 which may include a data string(s), a data sequence(s), or the like, for a model or component of the computing device(s) 102 to process. In various examples, the aggregation component 104 may receive the data 116 representing one or more of: a field description request, a security concept, example field information, validation of the output data 114, etc. The aggregation component 104 can, for example, retrieve data from a data stream, a database, a host device, a memory, and/or a storage device associated with the service system.

The semantic determination component 106 represents functionality to generate semantic data associated with the input data 112. The semantic data can, for example, include information describing a type of field, information in a field, human-readable metadata, computer-readable metadata, a creation time, just to name a few. In various examples, the semantic data can represent the output data 114 which may include one or more of: semantic information, schema mapping information (e.g., mapping differences in data sources, data formatting etc.), classifications (e.g., is the field a specific field type?, is a certain field present in the input data 112?), and the like.

In some examples, the semantic determination component 106 can determine one or more security concepts having a relationship with a security concept in the input data 112. For instance, the model(s) 108 can include a semantic data model configured to update and maintain a hierarchy of related concepts identifying related fields and/or related security concepts, and updating a hierarchy of the relationships between the security concepts over time (e.g., as values in a storage device).

In some examples, the semantic determination component 106 can implement or otherwise represent a large language model configured to receive some or all of the input data 112 and determine semantic data for data fields that already include data (e.g., to provide more accurate descriptions) and/or fields that do not include semantic data (e.g., lack a current description). At least a portion of the output by the large language model can be used as the output data 114 while in other examples the output by the large language model can be sent to another model or component (e.g., the semantic data model) for determining the output data 114. For instance, the model(s) 108 can include the semantic data model to generate semantic information based on the output from the large language model to improve descriptions versus using the semantic data model without the large language model.

As described herein, the model(s) 108 may be representative of machine learned models, statistical models, heuristic models, or a combination thereof. For instance, the computing device(s) can implement the model(s) 108 as a machine learning model (e.g., a large language model, etc.), a semantic data model, just to name a few. The large language model can, for instance, be trained to improve accuracy of a field description (e.g., a prediction) over time by receiving training data describing various field types, field names, field types, field examples, etc.

The database 110 can represent a storage device for storing field descriptions, security concepts, related security concepts (e.g., a hierarchy of concepts), etc. to perform the techniques described herein. In some examples, the semantic determination component 106 can store data values representing a catalog of field descriptions and associated security concepts. For example, a catalog entry can include values representing a description for a group of fields (e.g., a group of fields related to or describing a userid).

In some examples, the data 116 can include catalog data for exchanging between the computing device(s) 102 and the host device(s) 118. The computing device(s) 102 can, in various examples, transmit some or all of the output data 114 to the host device(s) 118 as the data 116. In various examples, the output data 114 can be validated by the host device(s) 118 (e.g., by a component or user thereof). For example, a description (or other output data) from the large language model and/or the semantic data model can be sent to the host device(s) 118 for validating the description (e.g., yes, no) or updating the description.

In some examples, a user (e.g., a developer, analyst, etc.) and/or a model associated with the host device(s) 118 can provide input to the semantic determination component 106 to verify accuracy of the output data 114 and/or to update the output data 114 prior to being included in a sharable catalog. For instance, the user can suggest that a different description be included in the catalog for output to other devices.

To proactively provide descriptions for fields at varying levels of detail, the semantic determination component 106 can implement a semantic data model that receives some descriptions from a large language model that is configured to output deterministic and/or non-deterministic descriptions. In examples when the large language model outputs non-deterministic descriptions, the semantic data model can determine whether to use or update the non-deterministic descriptions to improve a variety of descriptions for a field. For example, the semantic determination component 106 can provide a greater level of detail for a description provided by the large language model (e.g., identify descriptions related to the non-deterministic output). In various examples, the semantic data model can replace an existing description in a catalog or storage device with a description from the large language model.

In some instances, a training component (not shown) may be executed by one or more processor(s) of a computing device to train a machine learning model based on training data. The training data may include a wide variety of data, such as field sequences, field names, field types, or a combination thereof, that is associated with a value (e.g., a classification of interest, inference, prediction, etc.). Such values may generally be referred to as a "ground truth." To illustrate, the training data may be used for determining semantic data for portions of a data string, a byte slice, a byte array, or the like. The semantic data may be associated with one or more classifications or determinations. In some examples, such a classification may be based on user input (e.g., user input indicating that the data depicts a specific field) or may be based on the output of another machine learned model. In some examples, such labeled classifications (or more generally, the labeled output associated with training data) may be referred to as ground truth.

The host device(s) 118 may implement one or more data components 122 which is stored in memory of the host device(s) 118 and executable by one or more processors of the host device(s) 118. The host device(s) 118 may be or include any suitable type of device, including, without limitation, a mainframe, a work station, a personal computer (PC), a laptop computer, a tablet computer, a personal digital assistant (PDA), a cellular phone, a media center, an embedded system, a robotic device, a wearable device (e.g., sunglasses, clothing, etc.), a vehicle, a Machine to Machine device (M2M), an unmanned aerial vehicle (UAV), an Internet of Things (IoT), or any other type of device or devices capable of communicating via an instance of the data component(s) 122. An entity may be associated with the host device(s) 118, and the entity (user, computing device, organization, or the like) may have registered for security services provided by a service provider of the computing device(s) 102.

In some embodiments, the network(s) 120 may include any one or more networks, such as wired networks, wireless networks, and combinations of wired and wireless networks. Further, the network(s) 120 may include any one or combination of multiple different types of public or private networks (e.g., cable networks, the Internet, wireless networks, etc.). In some instances, the host device(s) 118 and the computing device(s) 102 communicate over the network(s) 120 using a secure protocol (e.g., https) and/or any other protocol or set of protocols, such as the transmission control protocol/Internet protocol (TCP/IP).

The data component(s) 122 can represent software, firmware, hardware, or a combination thereof, that is configured to exchange data with the computing device(s) 102, and the components thereof. In some examples, the data component(s) 122 can be configured to send or receive data associated with a security concept to and/or from the computing device(s) 102. The data component(s) 122 may provide functionality for the host device 118 to interface with the computing device(s) 102 to manage a security concept, request security recommendations, and/or receive field description data as described herein.

The data component(s) 122 may, in some examples, be kernel-level security agents, or similar security application or interface to implement at least some of the techniques described herein. Such kernel-level security agents may each include activity pattern consumers that receive notifications of events in a query that meet query criteria. The kernel-level security agents may each be installed by and configurable by computing device(s) 102, receiving, and applying while live, reconfigurations of agent module(s) and/or an agent situational model. Further, the kernel-level security agents may each output query results to the computing device(s) 102 that include the security-relevant information determined by the data component(s) 122. The data component(s) 122 may continue to execute on the host device(s) 118 by observing and sending detected activity to the computing device(s) 102 while the host device(s) 118 is powered on and running.

In some embodiments, the data component(s) 122 may be connected to the computing device(s) 102 via a secure channel, such as a virtual private network (VPN) tunnel or other sort of secure channel and may provide query results security-relevant information to the computing device(s) 102 through the secure channel. The data component(s) 122 may also receive configuration updates, instructions, remediation, etc. from the computing device(s) 102 via the secure channel.

Though depicted in FIG. 1 as separate components of the computing device(s) 102, functionality associated with the aggregation component 104, the semantic determination component 106, and/or the model(s) 108 can be included in a different component of the service system, a single component, or be included in the host device(s) 118. In some instances, the components described herein may comprise a pluggable component, such as a virtual machine, a container, a serverless function, etc., that is capable of being implemented in a service provider and/or in conjunction with any Application Program Interface (API) gateway.

Figure 2:
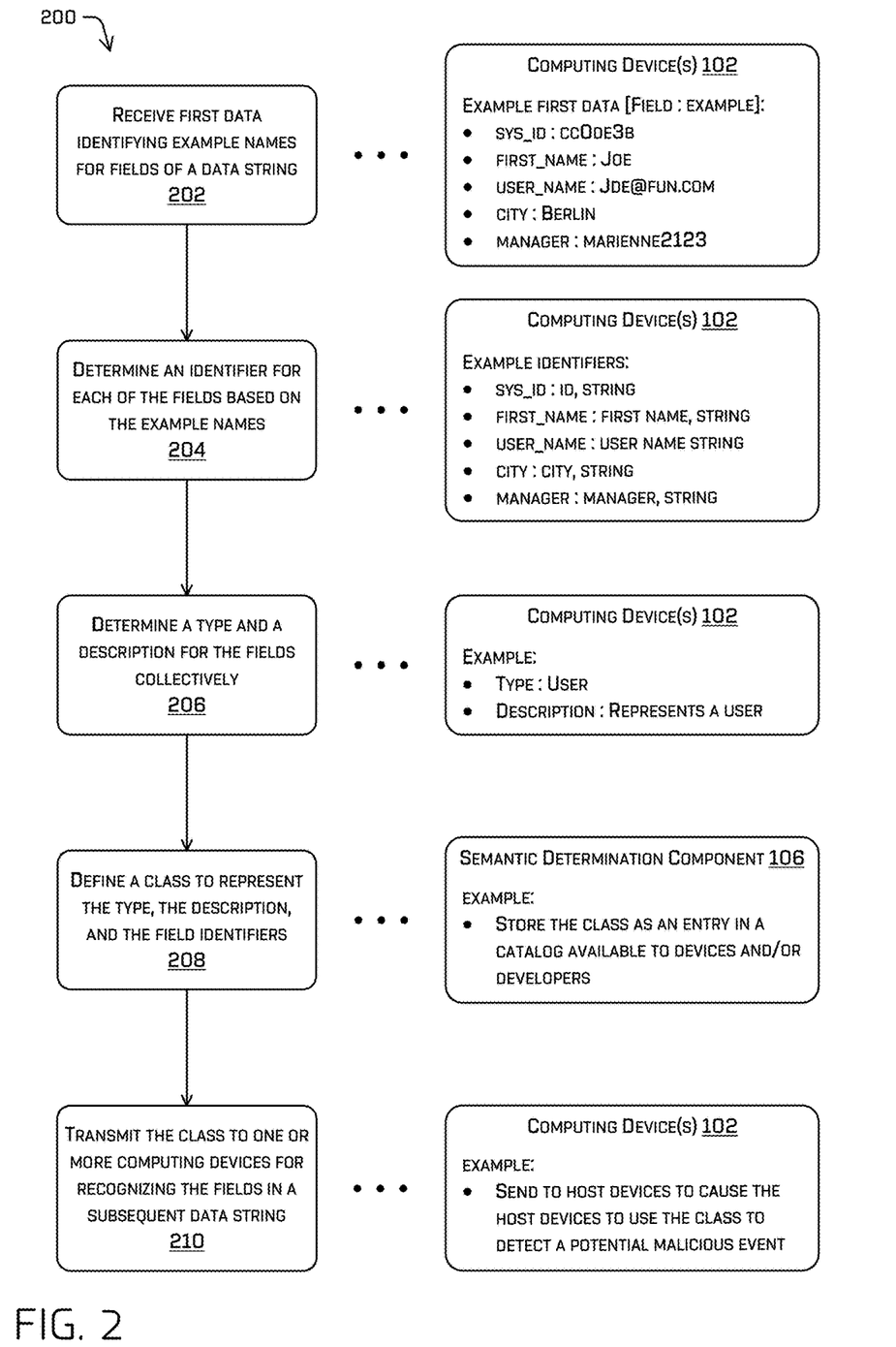
FIG. 2 is a pictorial diagram illustrating an example process to determine descriptions for fields of example input data by an example computing device, as described herein.

FIG. 2 is a pictorial diagram illustrating an example process 200 to determine descriptions for fields of example input data by an example computing device, as described herein. The example process 200 may be implemented by a computing device such as the computing device(s) 102 of FIG. 1. The computing device(s) 102 can implement the aggregation component 104, the semantic determination component 106, and/or the model(s) 108 to generate semantic data for a field or set of fields. The semantic data can be transmitted to a variety of computing devices (e.g., the host device(s) 102) to cause the computing device(s) to improve security by detecting fields in input data that are related to the field descriptions. In some examples, the input data can represent a dynamic data stream (e.g., a data stream that changes over time) comprising data strings from multiple data sources.

An operation 202 can include receiving the first data identifying example names for fields of a data string. In some examples, the aggregation component 104 of the computing device(s) 102 can receive the first data from a host device (e.g., the host device(s) 118). The first data can represent a set of fields and can include an example for each field in the set of fields, and may include a JavaScript Object Notation (JSON) file format. By way of example and not limitation, the first data can represent a security concept of one or more fields along with one or more examples of a respective field. A field can, for instance, include: sys_id, first_name, last_name, user_name, last_login, employee_number, email, department, city, works_for, manager, just to name a few. The field and example can be a key value pair such as sys_id:cc0de3b, first_name:Joe, last_name:Doe, user_name:Jde@fun.com, city:Berlin, manager:marienne2123, among others.

In various examples, the first data can include data associated with a third-party entity. For example, a data string can include fields from a transaction between the host device(s) 118 and a third-party device, and the data string may include a field that does not include a description.

An operation 204 can include determining an identifier for each of the fields based at least in part on the example names. For example, the operation 204 can include the computing device(s) 102 determining an identifier for each field in the set of fields of the first data such as sys_id:id, string; first_name:first name, string; user_name:user name, string; city:city, string; manager:manager, string, and so on. The identifier can include a string name, or other naming convention.

An operation 206 can include determining a type and a description for the fields collectively. For example, the operation 208 can include the semantic determination component 106 receiving the input data 112 and generating a field type to describe the set of fields. In the present example, the fields of the first data all relate to "a user" type and a description "represents a user". In other examples, the fields of the first data can be another type, such as a computing device, an IP address, or other entity.

An operation 208 can include defining a class to represent the type, the description for the fields collectively, and the field identifiers. For instance, the operation 208 can include the semantic determination component 106 determining a class (e.g., a set of values, etc.) to associate the description for the set of fields as an entry in a catalog of classes. In some examples, the semantic determination component 106 can cause the class to be stored in a storage device (e.g., the database 110) and/or transmitted to various computing devices prior to receiving a request from at least one of the computing devices.

An operation 210 can include transmitting the class to one or more computing devices for recognizing the fields in a subsequent data string. In some examples, data associated with the class can be sent to a host device to cause the host device to detect and analyze fields from a data stream, or other data source with a data string for analysis. In some examples, data describing a variety of fields and security concepts can be transmitted to the one or more computing devices to enable non-standardized data strings and/or data fields with missing or minimal descriptions to be analyzed and processed (e.g., to monitor a data stream having corresponding data fields to detect a potential malicious event).

Figure 3:
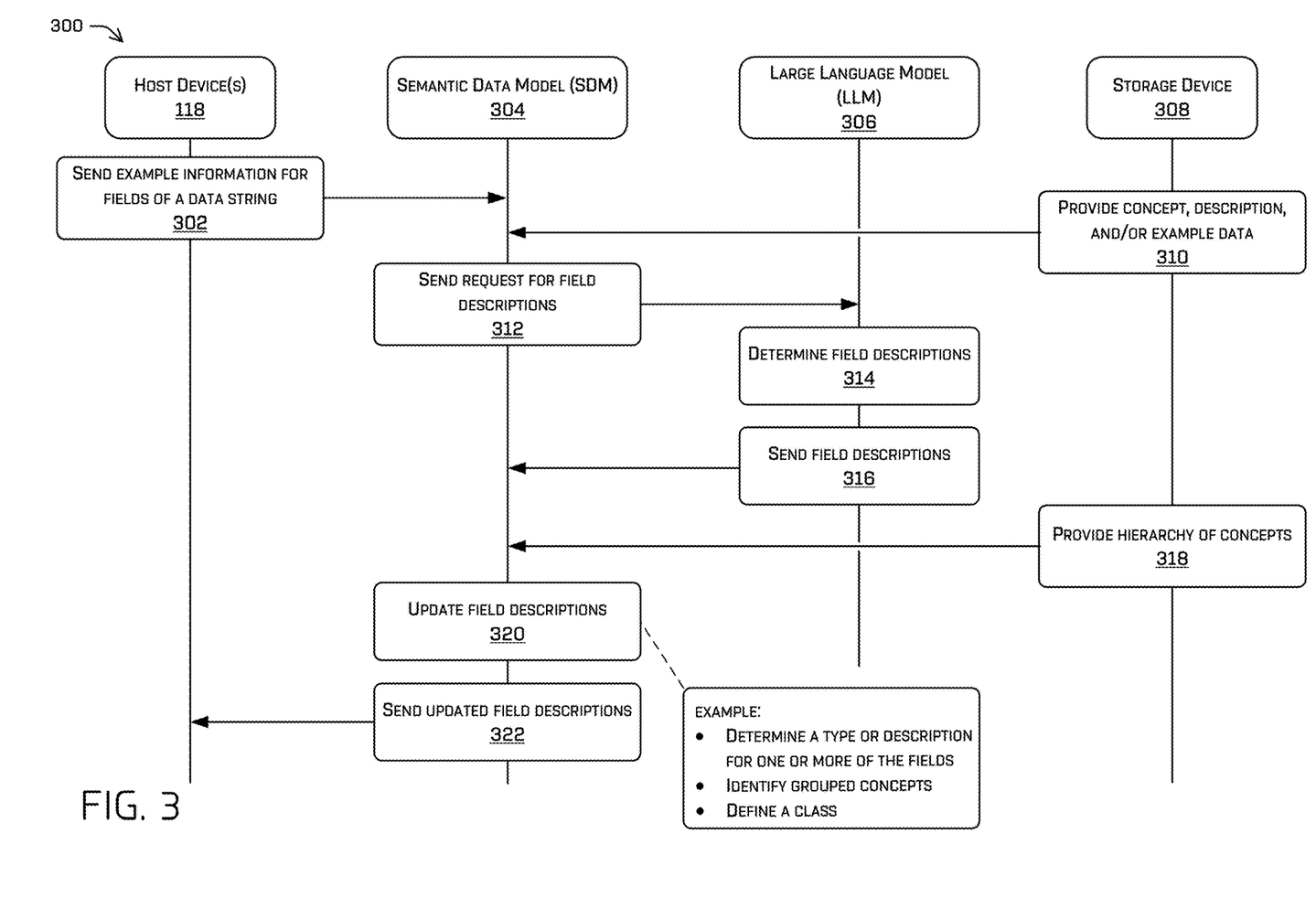
FIG. 3 is a pictorial diagram illustrating another example process for determining descriptions for data fields and optionally providing the descriptions to an example host device, as described herein.

FIG. 3 is a pictorial diagram illustrating another example process 300 for determining descriptions for data fields and optionally providing the descriptions to an example host device, as described herein. The example process 300 may be implemented by a computing device such as the computing device(s) 102 of FIG. 1. The computing device(s) 102 can implement the aggregation component 104, the semantic determination component 106, and/or the model(s) 108 to generate the output data 114 for sending to a computing device (e.g., the host device(s) 118). FIG. 3 further depicts a semantic data model (SDM) 304, a large language model (LLM) 306, and a storage device 308. The semantic data model 304 and the large language model 306 can be included in the computing device(s) 102 as the model(s) 108, for example. The storage device 308 can represent, for example, a registry, a database, a memory, or the like, and can include the functionality associated with the database 110 of FIG. 1.

An operation 302 can include the host device(s) 118 sending example information for fields of a data string to the semantic data model 304. For example, the semantic data model 304 can receive input data representing an example name, identifier, value, or the like for the fields (e.g., an example userid, example first name, etc.). The example information can be determined by a user or model of the host device(s) 118 and can, in some examples, represent a security concept for processing by the computing device(s) 102.

An operation 310 can include the storage device 308 providing security concept data, description data, and/or example data to the semantic data model 304. For example, the semantic data model 304 can access security concepts, field descriptions, and/or field examples from the storage device 308. In some examples, the operation 310 can be performed periodically (e.g., a pre-determined interval) and/or responsive to the host device(s) 118 sending the example information as part of operation 302. In some examples, the operation 310 can include the semantic data model 304 and/or the large language model 306 accessing an existing security concept, description of a security concept, description of a field, etc. from the storage device 308.

An operation 312 can include the semantic data model 304 sending a request for field descriptions to the large language model 306. For example, the semantic data model 304 can configure a message for sending to the large language model 306 based at least in part on receiving the example information at operation 302 and/or receiving the data from the storage device 308 at operation 310. In some examples, the semantic data model 304 can send a request for the field descriptions to the large language model 306 based at least in part on the data from the storage device 308 indicating that the fields of the data string (or a description thereof) has not been previously processed and/or included as part of the stored data.

At operation 314 can include the large language model 306 determining field descriptions for one or more fields of the data string. In various examples, the computing device(s) 102 can implement the large language model 306 to identify field descriptions based on receiving some or all of the example information from the host device(s) 118. The large language model 306 can use a variety of techniques to output deterministic and/or non-deterministic output data. In some examples, the output data may include a confidence value indicating a level of confidence in one or more of the field descriptions. The confidence value can represent a numeral (e.g., a higher number indicating a higher confidence), a classification (e.g., "high", "medium", or "low confidence), or the like. In various examples, the confidence value(s) associated with the output data can be considered by another model or component at a later time.

In various examples, the large language model 306 can determine the field descriptions based on accessing or otherwise receiving input data from the host device(s) 118 and/or the storage device 308. The large language model 306 can, for instance, detect missing descriptions for a field or set of fields, and predict human-readable and/or computer-readable data describing the field or the set of fields.

An operation 316 can include the large language model 306 sending field descriptions to the semantic data model 304. For example, the large language model 306 can configure a message for sending to the semantic data model 304 that includes the field descriptions determined at operation 314 (and the confidence values associated therewith).

An operation 318 can include the storage device 308 providing a hierarchy of concepts to the semantic data model 304. For instance, the semantic data model 304 can receive a hierarchy of concepts representing a ranked list of related security concepts (e.g., ranked by different levels of detail). For example, some concepts may be ranked by level of detail such that "IPAddress", "IPv4Address", and "IPv6Address" can represent a first hierarchy of concepts. An IPAddress can, in various examples, be represented in String, Hexadecimal, Octal, and/or Binary representations. The hierarchy of concepts can represent a set of entities in which each entity can be mandatory and/or optional in a respective hierarchy. An entity can include, for instance, "host_name", "os_name", "ip_address" which may collectively be grouped as "host"; "host", "user", "login" which further may be grouped as "remote_connection", just to name a few. In various examples, each entity can represent an independent concept.

An operation 320 can include the semantic data model 304 updating the field descriptions. For instance, the semantic data model 304 can determine, as updated field description data, a type and/or a description for the fields of the data string (e.g., received at operation 302) based at least in part on the field descriptions from the large language model 306 and/or the hierarchy of concepts from the storage device 308. The semantic data model 304 can, for example, parse the data string and output metadata (e.g., tags, labels, identifiers, words, etc.) to describe the fields of the data string. The metadata can include a description for a field included in the hierarchy of concepts. For example, the large language model 306 can receive concept information for one or more concepts which can include a concept name and a description and number of example representations (e.g., "phone_number" is a concept that can be represented in different formats "+1 202-918-2132" and "(954) 999-8221"). The large language model 306 can also or instead receive other concept names and example representations usable for the large language model 306 to determine respective field descriptions.

An operation 322 can include the semantic data model 304 sending the updated field descriptions to the host device(s) 118. For instance, the semantic data model 304 can transmit the type and/or the description for the fields of the data string to the host device(s) 118.

Figure 4:
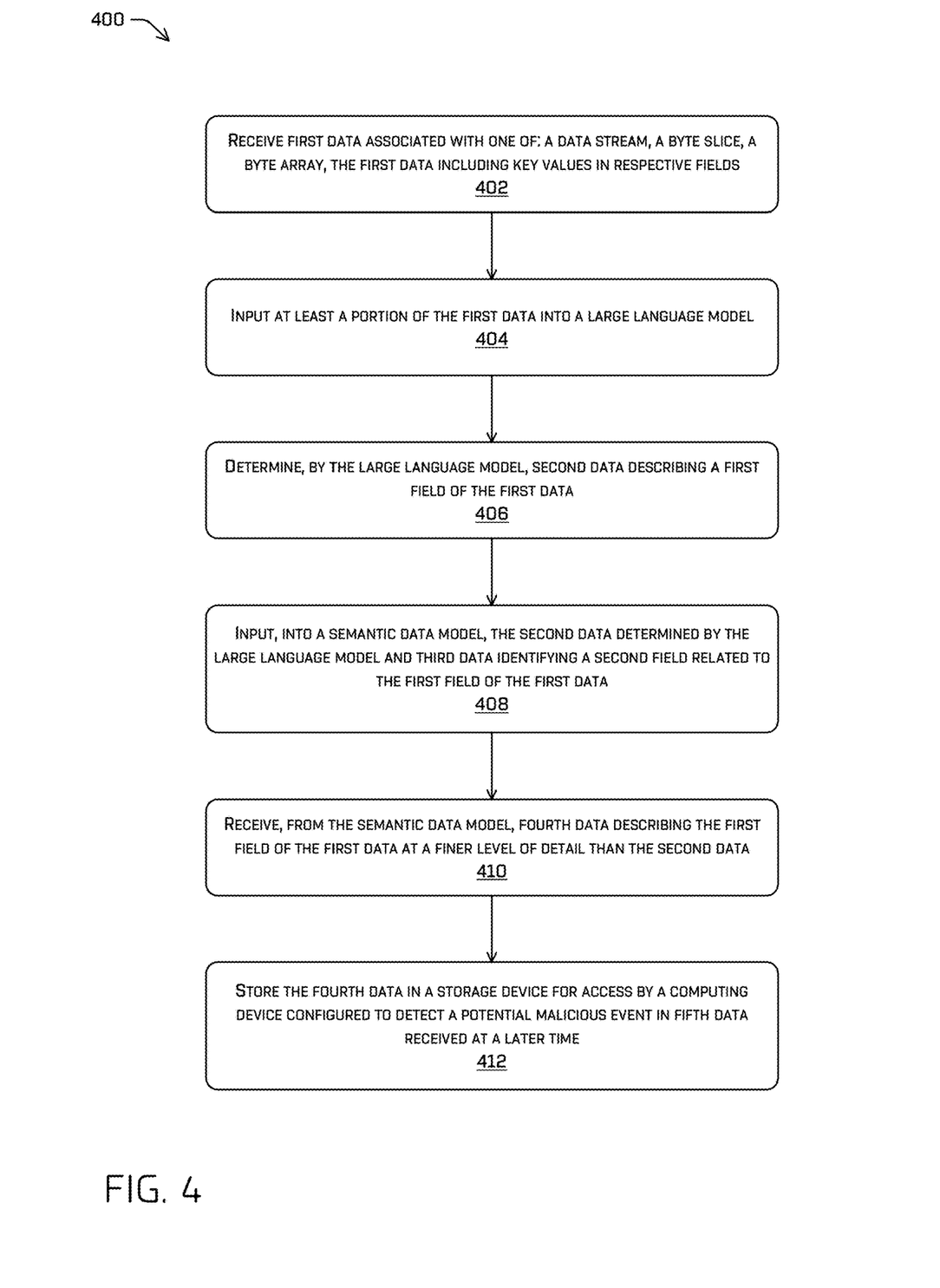
FIG. 4 is a flowchart depicting an example process for determining descriptions for fields of a data string.

FIG. 4 is a flowchart depicting an example process 400 for determining descriptions for fields of a data string. Some or all of the process 400 may be performed by one or more components in FIG. 1 as described herein. For example, some or all of process 400 may be performed by the computing device(s) 102 (or service associated therewith).

At operation 402, the process can include receiving first data associated with one of: a data string, a byte slice, a byte array, the first data including key values in respective fields. In some examples, the operation 402 can include the computing device(s) 102 receiving a security concept from a host device indicating a set of fields associated with one or more data strings. The security concept can provide examples for various fields for further analysis by the semantic determination component 106. By way of example and not limitation, the host device can transmit example fields and associated examples for key values in respective fields. A first key value of a first field can indicate an example user name, a second key value of a second field can indicate an example employer, and so on.

In various examples, the computing device(s) 102 can receive detection data associated with previous activity in a data stream of a host device (e.g., a potentially malicious process or thread, an instruction to write data to a memory, file, or the like). The detection data can, for example, include data strings, byte arrays, or another data structure for analysis. However, in other examples, the field descriptions can be output by the computing device(s) 102 prior to the host device processing the detection data.

At operation 404, the process can include inputting at least a portion of the first data into a large language model. For example, the computing device(s) 102 can input at least some of the first data into the model(s) 108 of FIG. 1 or the large language model 306 of FIG. 3. In some examples, the large language model 306 can also receive data from a storage device (e.g., the database 110) as part of the input data. Though described as a large language model in the present example, other model types including different machine learned models may also or instead be used to implement the techniques described herein.

At operation 406, the process can include determining, by the large language model, second data describing a first field of the first data. For instance, the large language model 306 can output second data representing a description for at least the first field of the first data (e.g., a data field of a data string) based on data received from the storage device. The description can replace or update a current field description or add a new description for a field that does not include a current description, depending on examples. In some examples, the description for the first field can identify whether or not the first field is associated with a third-party device, and optionally determine a name, a type, and/or description for the first field. In various examples, a data string (or other input data) can be received from, or associated with, a host device and also include a data transaction with a third-party device. By describing fields associated with third-party devices, a host device can receive the descriptions for detecting, parsing, analyzing, and so on, a data stream having data fields from third-party devices.

At operation 408, the process can include inputting, into a semantic data model, the second data determined by the large language model and third data identifying a second field related to the first field of the first data. For instance, the computing device(s) 102 can input the description data from the large language model 306 into a semantic data model (e.g., the semantic data model 304). The semantic data model can also receive one or more of: a set of security concepts, a hierarchy of security concepts, a list of related fields, field descriptions, or other data from a storage device, for example. In various examples, the hierarchy of security concepts can indicate a relationship between two or more security concepts (e.g., from different organizations receiving the field description as a service to enable a developer to define and use a security concept). The third data may also or instead represent storage data identifying a ranked list of fields related to a user, a computing device, a network device, and so on. In some examples, the third data can identify a data field of a third-party device that is related to a data field of a host device or other computing device.

At operation 410, the process can include receiving, from the semantic data model, fourth data describing the first field of the first data at a finer level of detail than the second data. For instance, the semantic determination component 106 can output the output data 114 indicating at least one field description having more detail than one of the field descriptions output by the large language model 306. In some examples, the fourth data can represent an additional level of detail in describing the first field (e.g., providing different types of user naming formats, etc.).

At operation 412, the process can include storing the fourth data in a storage device for access by a computing device configured to detect a potential malicious event in fifth data received at a later time. For instance, the computing device(s) 102 can implement the semantic determination component 106 to store the output data from the semantic data model 304 in the storage device 308. In this way, the fourth data can be available to various computing devices proactively (e.g., as catalog data) by transmitting some or all of the field descriptions and associated security concepts to a computing device prior to the computing device receiving data from some third-party devices.

Figure 5:
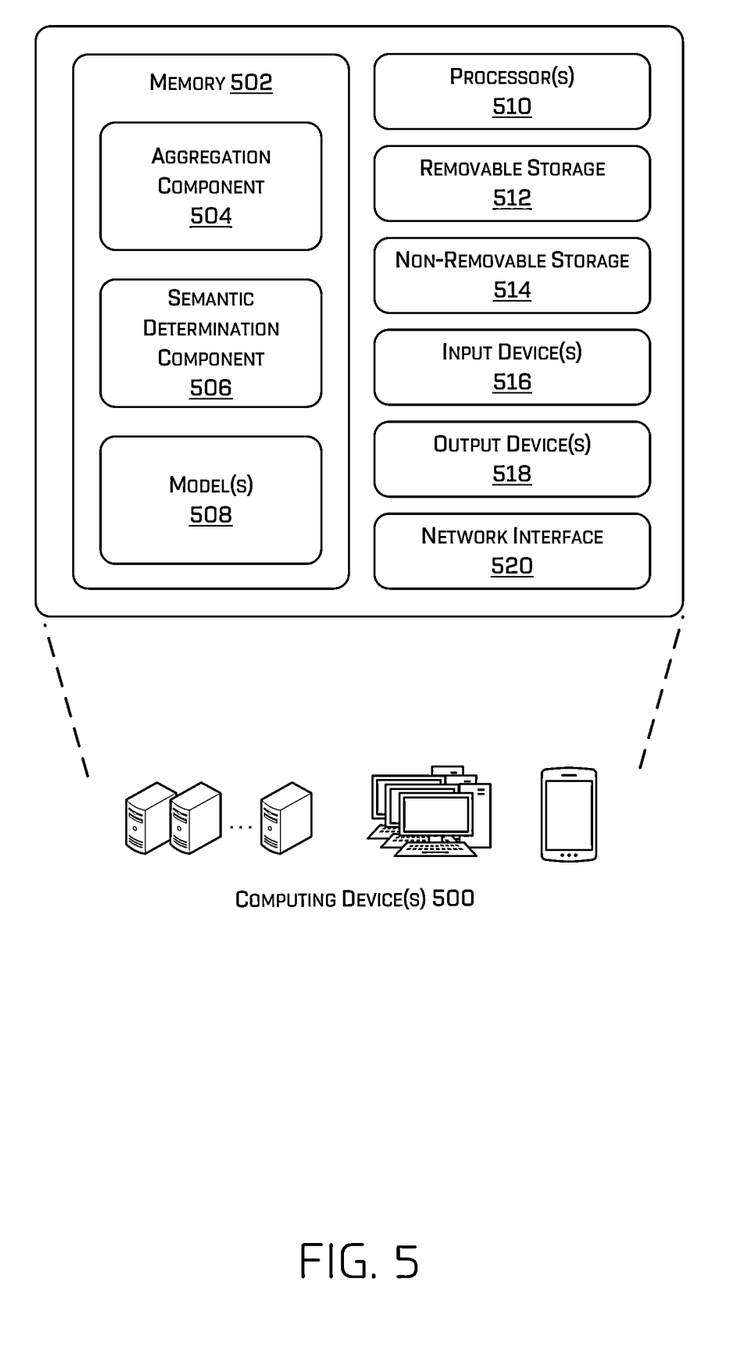
FIG. 5 is a block diagram of an illustrative computing architecture to implement the techniques describe herein.

FIG. 5 is a block diagram of an illustrative computing architecture of the computing device(s) 500 to implement the techniques describe herein. In some embodiments, the computing device(s) 500 can correspond to the host device(s) 102 or the computing device(s) 102 of FIG. 1. It is to be understood in the context of this disclosure that the computing device(s) 500 can be implemented as a single device or as a plurality of devices with components and data distributed among them. By way of example, and without limitation, the computing device(s) 500 can be implemented as various computing device 500(1), 500(2), . . . , 500(N) where N is an integer greater than 1.

As illustrated, the computing device(s) 500 comprises a memory 502 storing an aggregation component 504, a semantic determination component 506, and model(s) 508. Also, the computing device(s) 500 includes processor(s) 510, a removable storage 512 and non-removable storage 514, input device(s) 516, output device(s) 518, and network interface 520.

In various embodiments, memory 502 is volatile (such as RAM), non-volatile (such as ROM, flash memory, etc.) or some combination of the two. The aggregation component 504, the semantic determination component 506, and the model(s) 508 stored in the memory 502 can comprise methods, threads, processes, applications or any other sort of executable instructions. The aggregation component 504, the semantic determination component 506, and the model(s) 508 can also include files and databases.

In various embodiments, the memory 502 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The memory 502 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 502 may be part of the security service system.

The aggregation component 504 may receive and store any client entity information and their associated security information including observed activity patterns received from the data component(s) 122 on the respective host device(s) 118. The aggregation component 504 may gather data from other modules that may be stored in a data store. In some embodiments, the aggregation component 504 may gather and store data associated with known information, such as domain information that is associated with known entities, for access as input data by the semantic determination component 506 (or other component).

In some examples, the aggregation component 504 can correspond to, or otherwise include the functionality of, the aggregation component 104 of FIG. 1.

In some instances, the semantic determination component 506 can correspond to, or otherwise include the functionality of, the semantic determination component 106 of FIG. 1.

In some instances, the model(s) 508 can correspond to, or otherwise include the functionality of, the model(s) 108 of FIG. 1.

In some instances, any or all of the devices and/or components of the computing device(s) 500 may have features or functionality in addition to those that FIG. 5 illustrates. For example, some or all of the functionality described as residing within any or all of the computing device(s) 500 may reside remotely from that/those computing device(s) 500, in some implementations.

The computing device(s) 500 may be configured to communicate over a telecommunications network using any common wireless and/or wired network access technology. Moreover, the computing device(s) 500 may be configured to run any compatible device operating system (OS), including but not limited to, Microsoft Windows Mobile, Google Android, Apple iOS, Linux Mobile, as well as any other common mobile device OS.

The computing device(s) 500 also can include input device(s) 516, such as a keypad, a cursor control, a touch-sensitive display, voice input device, etc., and output device(s) 518 such as a display, speakers, printers, etc. These devices are well known in the art and need not be discussed at length here.

As illustrated in FIG. 5, the computing device(s) 500 also includes the network interface 520 that enables the computing device(s) 500 of the security service system to communicate with other computing devices, such as any or all of the host device(s) 102.

FIGS. 2-4 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 2 may omit operations 210 and the example process of FIG. 3 may omit operations 302, 310, and 312. In some examples, the example process of FIG. 4 may omit operation 412.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the process 200 may omit the operation 210 and/or the process 300 can omit the operations 312 and/or 322. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving, by a semantic data model, first data associated with one of: a data stream, a byte slice, or a byte array, the first data including fields for a value or a key;
determining, by the semantic data model and based on the first data, first descriptions for the fields of the first data;
inputting at least a portion of the first data into a large language model;
determining, by the large language model, second descriptions for the fields of the first data, the second descriptions having a finer level of detail in describing the fields than the first descriptions;
inputting, into the semantic data model, the second descriptions from the large language model and hierarchical data identifying a relationship among two or more of the fields;
receiving, from the semantic data model, third descriptions of the fields of the first data and a fourth description of at least one additional field different from the fields of the first data; and
storing the third descriptions and the fourth description in a storage device for access by a computing device at a later time, the computing device configured to detect a potential malicious event in second data based at least in part on the third descriptions.

2. The system of claim 1, wherein:
the first data is received from a host device and represents a security threat concept provided by a model or a user of the host device, and
the hierarchical data represents a hierarchy of concepts.

3. The system of claim 1, the operations further comprising:
validating one or more descriptions of the third descriptions based at least in part on an input from a host device,
wherein storing the third descriptions in the storage device is based at least in part on validating the one or more descriptions of the third descriptions.

4. The system of claim 1, the operations further comprising:
sending, by the semantic data model, a message requesting information from the large language model,
wherein determining the second descriptions for the fields of the first data by the large language model is based at least in part on sending the message.

5. The system of claim 1, wherein the fields are first fields, and the operations further comprising:
accessing, by the computing device, the third descriptions from the storage device;
receiving, by the computing device, the second data comprising at least one field without a description; and
determining the description for the at least one field based at least in part on the third descriptions.

6. The system of claim 1, wherein:
the second descriptions for the fields determined by the large language model is non-deterministic,
the hierarchical data indicates a hierarchy of the at least one additional field related to the fields of the first data,
the third descriptions includes a finer level of detail for at least one of the fields relative to one of the second descriptions, and
the third descriptions represent semantic information for each of the fields.

7. One or more non-transitory computer-readable media storing instructions executable by one or more processors, wherein the instructions, when executed, cause the one or more processors to perform operations comprising:
receiving first data associated with one of: a data stream, a byte slice, or a byte array, the first data including key values in respective fields;
inputting at least a portion of the first data into a large language model;
determining, by the large language model, second data describing a first field of the first data;
inputting, into a semantic data model, the second data determined by the large language model and third data identifying a second field related to the first field of the first data;
receiving, from the semantic data model, fourth data describing the first field of the first data at a finer level of detail than the second data; and
storing the fourth data in a storage device for access by a computing device configured to detect a potential malicious event in fifth data received at a later time.

8. The one or more non-transitory computer-readable media of claim 7, wherein:
the first data is received from a host device and represents a security threat concept provided by a model or a user of the host device, and
the third data represents a hierarchy of security concepts.

9. The one or more non-transitory computer-readable media of claim 7, the operations further comprising:
validating the fourth data based at least in part on an input from a host device,
wherein storing the fourth data in the storage device is based at least in part on validating one or more descriptions of the fourth data.

10. The one or more non-transitory computer-readable media of claim 7, the operations further comprising:
sending, by the semantic data model, a message requesting information from the large language model,
wherein determining the third data by the large language model is based at least in part on sending the message.

11. The one or more non-transitory computer-readable media of claim 7, the operations further comprising:
accessing, by the computing device, fourth data from the storage device;
receiving, by the computing device, the second data comprising at least one field without a description; and
determining the description for the at least one field based at least in part on the fourth data.

12. The one or more non-transitory computer-readable media of claim 7, the operations further comprising:
transmitting the fourth data to the computing device; and
causing the computing device to detect the potential malicious event in the fifth data based at least in part on the fourth data describing the first field of the first data.

13. The one or more non-transitory computer-readable media of claim 7, wherein the fourth data comprises one or more of:
a relationship between a first field and a second field of the first data,
a human-readable name, and
a creation time of a description of the first field.

14. The one or more non-transitory computer-readable media of claim 7, the operations further comprising:
receiving the first data from a third-party device, and determining the fourth data to describe the first field of the first data from the third-party device.

15. The one or more non-transitory computer-readable media of claim 7, the operations further comprising:
determining that the first field of the first data does not follow a standard format; and
determining the second data by the large language model based at least in part on determining that the first field does not follow the standard format.

16. The one or more non-transitory computer-readable media of claim 7, the operations further comprising:
receiving the first data from a host device, the first data describing a security concept for implementing on the host device at a later time;
associating, as an entry in the storage device, the security concept with the fourth data describing the first field of the first data; and
determining labels for the key values.

17. A computer-implemented method comprising:
receiving first data associated with one of: a data stream, a byte slice, or a byte array, the first data including key values in respective fields;
inputting at least a portion of the first data into a large language model;
determining, by the large language model, second data describing a first field of the first data;
inputting, into a semantic data model, the second data determined by the large language model and third data identifying a second field related to the first field of the first data;
receiving, from the semantic data model, fourth data describing the first field of the first data at a finer level of detail than the second data; and
storing the fourth data in a storage device for access by a computing device configured to detect a potential malicious event in fifth data received at a later time.

18. The computer-implemented method of claim 17, wherein:
the first data is received from a host device and represents a security threat concept provided by a model or a user of the host device, and
the third data represents a hierarchy of security concepts.

19. The computer-implemented method of claim 17, further comprising:
validating the fourth data based at least in part on an input from a host device,
wherein storing the fourth data in the storage device is based at least in part on validating one or more descriptions of the fourth data.

20. The computer-implemented method of claim 17, further comprising:
sending, by the semantic data model, a message requesting information from the large language model,
wherein determining the third data by the large language model is based at least in part on sending the message.

* * * * *